United States Patent
McCarthy et al.

(10) Patent No.: US 10,367,436 B2
(45) Date of Patent: Jul. 30, 2019

(54) SINGLE-AXIS LINEAR MOTION SYSTEM

(71) Applicant: Invetech, Inc., San Diego, CA (US)

(72) Inventors: Kevin McCarthy, Plaistow, NH (US); David Thomas, Acton, MA (US)

(73) Assignee: Invetech, Inc., San Diego, CA (US)

( * ) Notice: Subject to any disclaimer, the term of this patent is extended or adjusted under 35 U.S.C. 154(b) by 0 days.

(21) Appl. No.: 15/901,869

(22) Filed: Feb. 21, 2018

(65) Prior Publication Data

US 2018/0241328 A1    Aug. 23, 2018

Related U.S. Application Data

(60) Provisional application No. 62/461,383, filed on Feb. 21, 2017.

(51) Int. Cl.

| | |
|---|---|
| H02K 41/00 | (2006.01) |
| H02P 7/025 | (2016.01) |
| H02K 41/035 | (2006.01) |
| H02K 5/173 | (2006.01) |
| H02K 11/22 | (2016.01) |
| H02K 7/12 | (2006.01) |
| H02K 11/33 | (2016.01) |
| H02K 41/03 | (2006.01) |
| H02P 25/06 | (2016.01) |
| H02K 11/21 | (2016.01) |
| H01R 12/72 | (2011.01) |
| F16C 29/06 | (2006.01) |

(52) U.S. Cl.
CPC ............ *H02P 7/025* (2016.02); *H02K 5/173* (2013.01); *H02K 7/125* (2013.01); *H02K 11/21* (2016.01); *H02K 11/22* (2016.01); *H02K 11/33* (2016.01); *H02K 41/031* (2013.01); *H02K 41/0356* (2013.01); *H02P 25/06* (2013.01); *F16C 29/0633* (2013.01); *H01R 12/722* (2013.01); *H02K 2211/03* (2013.01)

(58) Field of Classification Search
CPC ......... H01L 21/67144; G11B 11/10573; H02P 25/06

See application file for complete search history.

(56) References Cited

U.S. PATENT DOCUMENTS

| | | |
|---|---|---|
| 5,598,739 A | 2/1997 | Blake et al. |
| 6,064,128 A | 5/2000 | Yagoto et al. |
| 7,135,827 B1 | 11/2006 | Lampson |
| 2002/0180386 A1 | 12/2002 | Kyomasu et al. |
| 2003/0005785 A1 | 1/2003 | Ung et al. |
| 2003/0094348 A1 | 5/2003 | Lee |

(Continued)

OTHER PUBLICATIONS

International Search Report and Written Opinion for corresponding International Patent Application Serial No. PCT/US18/19062 dated May 10, 2018.

*Primary Examiner* — Karen Masih
(74) *Attorney, Agent, or Firm* — Reed Smith LLP

(57) ABSTRACT

A linear motion system utilizing one or more printed circuit boards embedded within a stage wherein the system components, including the controller, drive, and controller, may be mounted to a printed circuit board (PCB), and the electrical communications between the system components and the power to the system components are supplied through traces or etchings on the printed circuit board, thereby omitting the need for additional power and communication cables.

16 Claims, 15 Drawing Sheets

(56) References Cited

U.S. PATENT DOCUMENTS

| | | |
|---|---|---|
| 2003/0111912 A1 | 6/2003 | Binnard et al. |
| 2004/0012305 A1 | 1/2004 | Heilig et al. |
| 2005/0236911 A1 | 10/2005 | Botos et al. |
| 2005/0271310 A1 | 12/2005 | Maffeis |
| 2006/0049700 A1 | 3/2006 | Moriyama |
| 2008/0127486 A1* | 6/2008 | Hirata ............... H01L 21/67144 |
| | | 29/832 |
| 2008/0308611 A1 | 12/2008 | Alessi et al. |
| 2010/0194328 A1 | 8/2010 | Widdowson et al. |
| 2010/0243622 A1 | 9/2010 | Kosmowski |
| 2011/0043618 A1 | 2/2011 | Salisbury et al. |
| 2011/0089771 A1 | 4/2011 | Brooker et al. |
| 2013/0154399 A1 | 6/2013 | Schneider et al. |
| 2014/0346900 A1 | 11/2014 | Bobelis et al. |

* cited by examiner

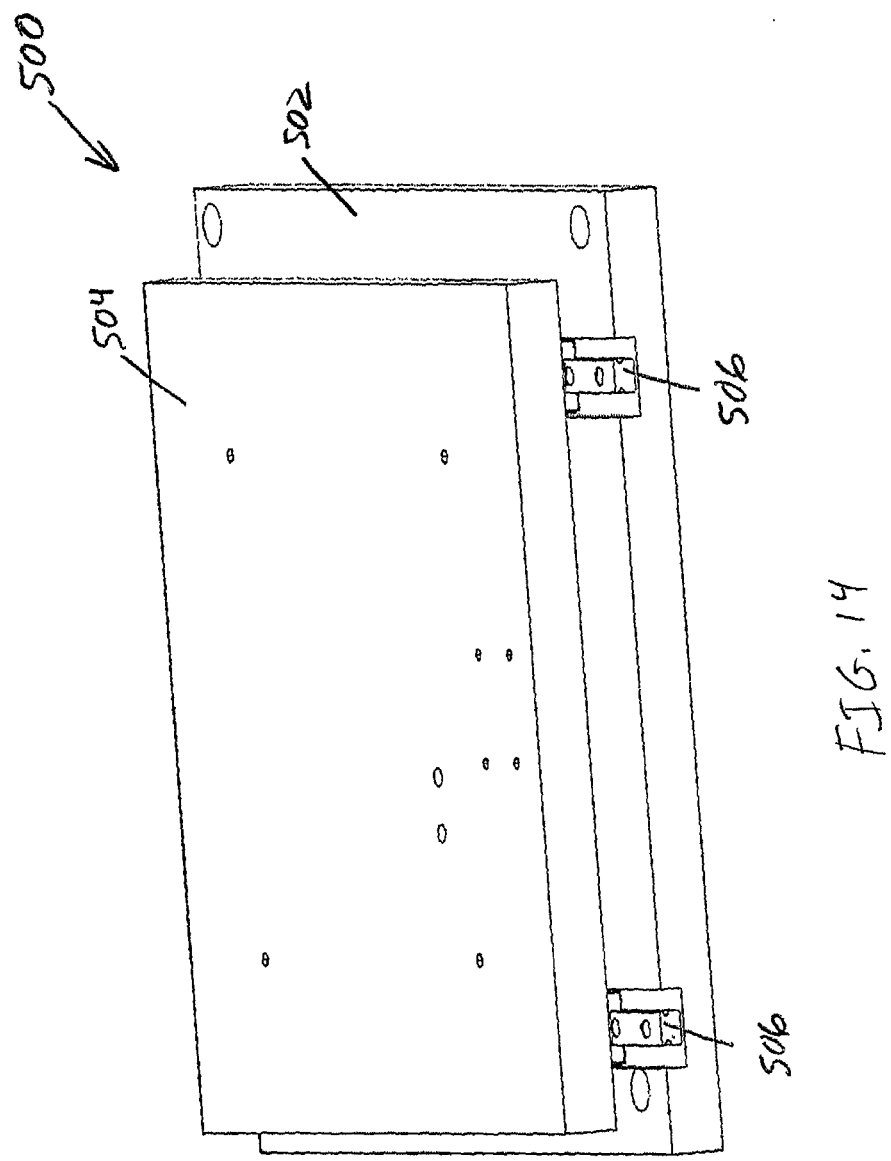

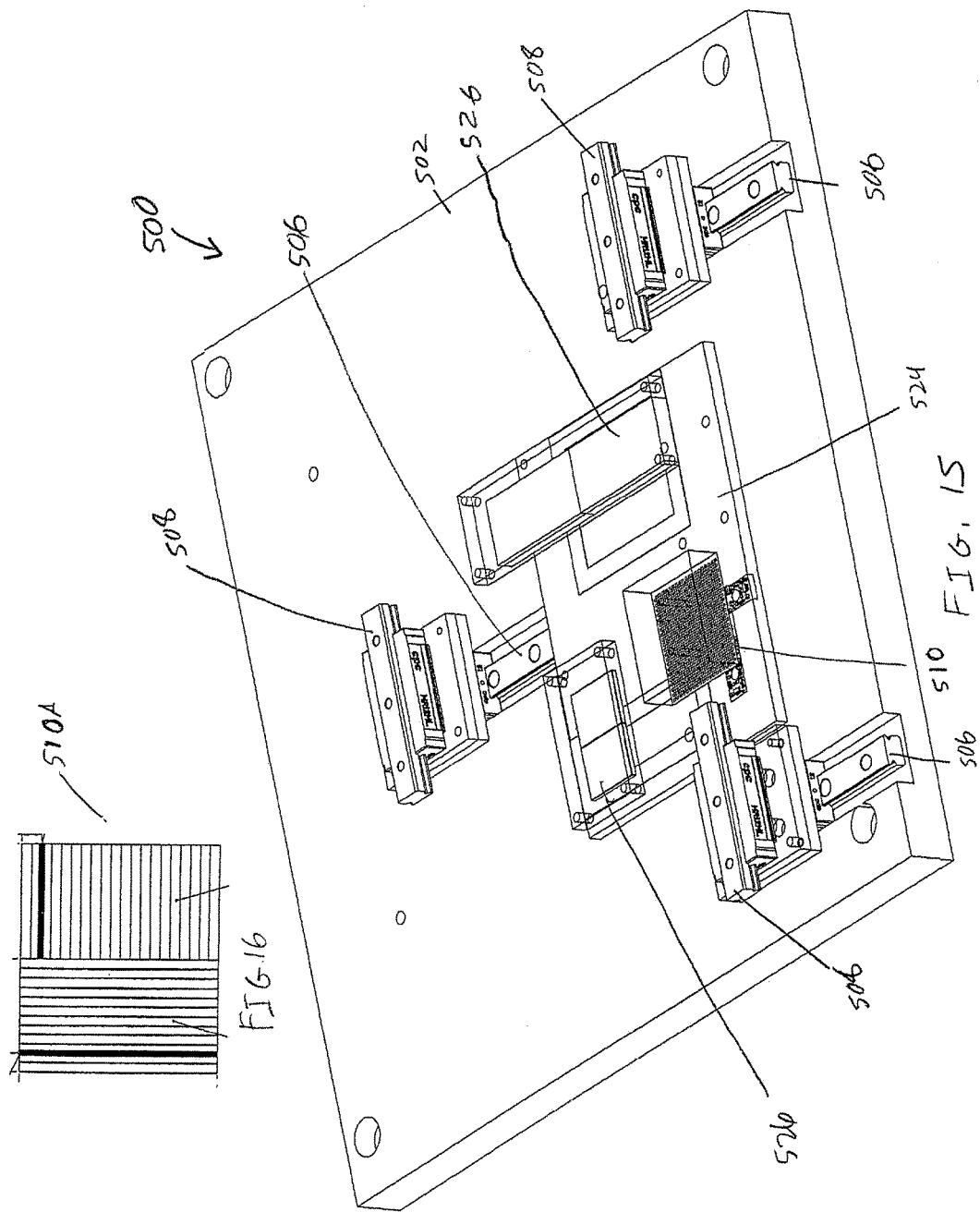

SINGLE-AXIS LINEAR MOTION SYSTEM

CROSS-REFERENCE TO RELATED APPLICATION

The present application claims the benefit of U.S. Provisional Application No. 62/461,383, filed Feb. 21, 2017 and titled "Motor coil, Encoder and Drive on a Printed Circuit Board and Method of Making and Using Same," the disclosure of which is herein incorporated by reference.

BACKGROUND

Linear motion systems are used to produce precise linear motion along at least one axis of direction. Applications of linear motion systems include any application in which linear motion may be desired. This type of motion is useful in robots, actuators, tables/stages, fiberoptics/photonics alignment and positioning, assembly, machine tools, semiconductor equipment, electronic manufacturing, vision systems, and in many other industrial automation applications. Other applications of linear motion systems include precision medical applications, such as automated digital microscopy which supports a wide range of applications, including cellular imaging and diagnostic instruments, automated inspection and metrology, and DNA sequencing. In microscopy, linear motion systems may be used to control the vertical position of an objective as well as control the position of a specimen in a horizontal plane perpendicular to the axis of an objective.

In a typical linear motion system, a moving carriage can be driven (made to move back and forth) with a variety of motors. These can include, for example, piezo actuators, linear motors, rotary motors and screws, rotary motors and belts, and rotary motors and rack and pinion. Linear motors used in a linear motion system typically include an array of magnets and one or more coils that carry current. The array of magnets may produce a static magnetic field, whereas the coils produce a time-varying magnetic field that depends on the current flowing through the coils. The magnetic field produced by the coils interacts with the static magnetic field to generate a force. For example, in some configurations, the produced force may be linearly proportional to the current and the static magnetic field. The force that is generated can be controlled by controlling the current flowing through the coils. In particular, an electronic motion controller is used to determine the amount of current that should flow through the coils to produce the intended motion. An electronic drive can receive logic-level commands from the electronic controller and translate those commands into the currents that flow through the one or more coils.

Generally, linear motion systems include a stage featuring a stationary base and a moving carriage. In a linear motion system including a linear motor, current flows through the one or more coils of the linear motor. The moving carriage can move relative to the stationary base along a linear axis. To guide the moving carriage along a straight line, the stage can include linear guideways. In addition, the linear motion stage may include an encoder, which can measure the position of the moving carriage relative to the stationary base. A position signal from the encoder may be provided to the controller to assist the controller in determining the correct amount of current to be supplied by the drive to the one or more coils to achieve a desired position. Such linear motors, which use position feedback to control motion and final position, are referred to as linear servomotors.

Traditional linear motion systems suffer from a number of problems. For example, interface cables must be provided that connect the drive and coils. Such interface cables increase the cost of materials of a linear motion system as well as the cost of assembly. This setup requires interface cables, often containing up to fifteen conductors per cable. This arrangement also requires special routing features for the cabling to exit the system to the drive. In addition, the controller, drive, and interface cables increase the weight and size of the linear motion system.

Traditional linear motion systems require multiple components (i.e., motor, encoder, drive, etc.) to be assembled in a potentially labor intensive process. Connections are typically made using expensive cabling and connectors. This cabling carries sensitive, critical signals (i.e. encoder feedback) and high motor currents.

Two linear motion stages may be combined to form a dual-axis linear motion system. For example, a first linear motion stage may provide motion along an x axis, whereas a second linear motion stage may provide motion along a y axis that is perpendicular to the x axis. Dual-axis linear motion stages are typically formed from at least three plates, which are usually metal. In particular, a typical dual-axis linear motion system includes a base plate, a top plate, and a third center plate that separates the base plate and top plate.

In addition to the above problems, two-axis linear motion systems suffer from additional problems. For example, the presence of the third center plate adds bulk, weight, and cost to the system.

It is, therefore, an object of the present disclosure to overcome the above problems and others by providing a linear motion system with integrated components such as controller, drive, motor and encoder. In addition, it is an object of the present disclosure to overcome the above problems by providing a miniaturized stage. Furthermore, it is an object of the present disclosure to overcome the above problems by providing a motion system that is more cost-effective to manufacture.

SUMMARY

The present disclosure is directed generally to a linear motion system utilizing one or more printed circuit boards embedded within a stage wherein the system components are mounted to the printed circuit board (PCB), and the electrical communications between the system components and the power to the system components are supplied through traces or etchings on the printed circuit board, thereby omitting the need for additional power and communication cables. The embedded PCB can include a controller and drive integral to the PCB. The controller and drive may be separate components soldered to the PCB, or the controller and drive may be combined into a single component. The current signal output from the drive may be transmitted to one or more coils via tracings in the PCB. The controller is a set of electronics that takes commands either stored in it or sent from a host computer, and interprets these to cause the appropriate motion to occur. It sets up a desired trajectory of velocity vs. time, controls the start and final positions, and all positions in-between, by implementing a servo loop in which desired and actual position (from the encoder) are compared, and current commands are sent to the electronic drive to cause the coil currents to be updated at high speed (up to 20K times a second) to force the moving carriage to the correct position, velocity, acceleration, and jerk along its required trajectory. The electronic drive includes the power electronics that translates logic-level commands from the electronic controller into the currents needed to flow in the coil.

Preferred embodiments include a linear encoder to determine the position of the moving carriage relative to the stationary base. The encoder may be either optical or magnetic and includes a small read head which detects the position along a longer encoder scale. The encoder preferably is located internal to the stage. For example, the encoder may also be mounted to the same PCB as the controller and drive. In addition, the encoder may be absolute or incremental. Absolute encoders can determine their position at power-on, but are more complicated and expensive. Incremental encoders are simpler, cheaper and work at faster speeds. In at least one embodiment, the one or more coils of the linear motor and the encoder read head are in the stationary base of the stage, and no moving cables are required. In others, the coils and/or encoder read head move, and so a set of moving cables are required.

In some embodiments, the linear motion system includes a single stage for travel back and forth along a single direction (e.g., x). In other embodiments, two or more stages can be combined together for travel along two or more directions (e.g., x-y). In these other embodiments, a PCB can serve as a center structure that separates the lower base from an upper moving carriage.

The linear motion system uses linear guideways to guide the moving carriage relative to the stationary base. The linear guideways use rolling steel bearings to guide the moving carriage in a straight line. In some embodiments, the linear guideways may be crossed roller bearings. Crossed roller bearings may include equal length stationary and moving rails. These can be used in pairs, with two stationary rails and two moving rails. The two stationary rails can be mounted to a base, while the two moving rails can be mounted to an equally long moving carriage. As it moves to either side of center, the moving carriage overhangs the base and its rails.

In some embodiments, the linear guideways may be recirculating bearings. Linear recirculating bearings can include one or more long linear rails, which are stationary and fasten to a base or surface beneath them. Smaller ball-bearing trucks can be coupled to grooves in the rails that permit the trucks to roll along the grooves in the linear rail. In a typical single-axis system, there may be two parallel linear rails, each with two trucks mounted thereon, for a total of four trucks. The moving carriage can be attached to these four trucks. A recirculating bearing system typically has a long stationary base and a shorter moving carriage that rolls along the rails. The rail length minus the carriage length generally may determine the available travel. In some embodiments, the linear guideways could be air bearings or flexures.

In some embodiments, the one or more coils that conduct current may be mounted to a stationary surface, such as the PCB and/or base, and magnets may be mounted to a surface that moves relative to the coils, such as a moving carriage and/or upper plate. For example, embodiments that use crossed roller stages may employ one or more coils that are mounted to the PCB or base. The one or more coils that conduct current generate force since they are in magnetic field of magnets which may have steel elements to focus the magnetic field towards the one or more coils.

In other embodiments, the magnets may be mounted to a stationary surface, and the one or more coils that receive current may be mounted to a surface that moves relative to the magnets. For example, embodiments that use recirculating bearings may employ coils that are mounted to the moving carriage. In these embodiments, a cable may transfer power to the moving carriage. A PCB that includes an integral controller and drive may be mounted internal to the moving carriage. The PCB may receive power from the cable, and the controller and drive may supply current to the one or more coils. The PCB with integral controller and drive may also be mounted anywhere else within the stage, and a cable may connect the drive to the moving carriage to supply current to the one or more coils.

In at least one embodiment, the presently disclosed technology works by fastening bearings or other linear motion elements directly to each other with the PCB as a spacer. The presently disclosed technology relies on bearing rails for structure as the PCB does not undergo significant forces. The PCB can include through holes for the bolts or other fasteners to go from the rail of the upper axis, to the tapped holes in the trucks of the lower axis. The PCB can also contain one or more fasteners such as threaded studs that can be pressed into a PCB.

In at least one embodiment, the components can include some or all of the following: one or more printed circuit boards, copper magnet wire coil(s), coil potting, position sensor(s), drive stage(s), limit switch(es), microcontroller (s), motion controller(s), dc-dc converter(s), communication transceiver(s), passive electronics (i.e. resistors and capacitors), and connector(s). These components can be discrete or integrated (i.e. microcontroller with integrated communication transceiver and motion controller).

In at least one embodiment the motor coils, controller, and/or drive are mounted on the PCB. The encoder can be optional depending on whether the application calls for sensored or sensorless (i.e. Back EMF measurement) control.

In at least one embodiment, the presently disclosed technology works by soldering and potting motor coil(s) to a PCB. The PCB can provide all drive current and communication through its traces.

In one embodiment, the presently disclosed technology is specific to linear motors as opposed to typical systems that use rotary motors that translate to linear motion. This type of motion is very common in machine tools and factory automation where the rotary to linear conversion mechanism provides a high mechanical advantage to move a heavy load. The presently disclosed technology is most suitable for precision medical application, such as imaging, where a small load is being moved with high smoothness and accuracy requirements.

In at least one embodiment, the presently disclosed technology only needs communication and power to be cabled. The communication can utilize error checking. The power is inherently lower current due to the nature of the design and may utilize higher gauge, low cost conductors.

In at least one embodiment, the presently disclosed technology is ideal for low cost, compact, single or multi-axis linear motion. This is also ideal for situations where the control electronics would be far away from the motor and feedback.

BRIEF DESCRIPTION OF THE SEVERAL VIEWS OF THE DRAWINGS

The foregoing summary, as well as the following detailed description of the presently disclosed technology, will be better understood when read in conjunction with the appended drawings. For the purpose of illustrating the invention, there are shown in the drawings various illustra

FIG. 14 is a perspective view of a dual axis linear motion system according to another embodiment having linear recirculating bearings.

FIG. 15 is a top perspective view of the dual axis linear motion system of FIG. 14 with the moving carriage removed.

FIG. 16 is a depiction of a two-dimensional encoder scale of FIG. 15.

DETAILED DESCRIPTION

Figure 1:
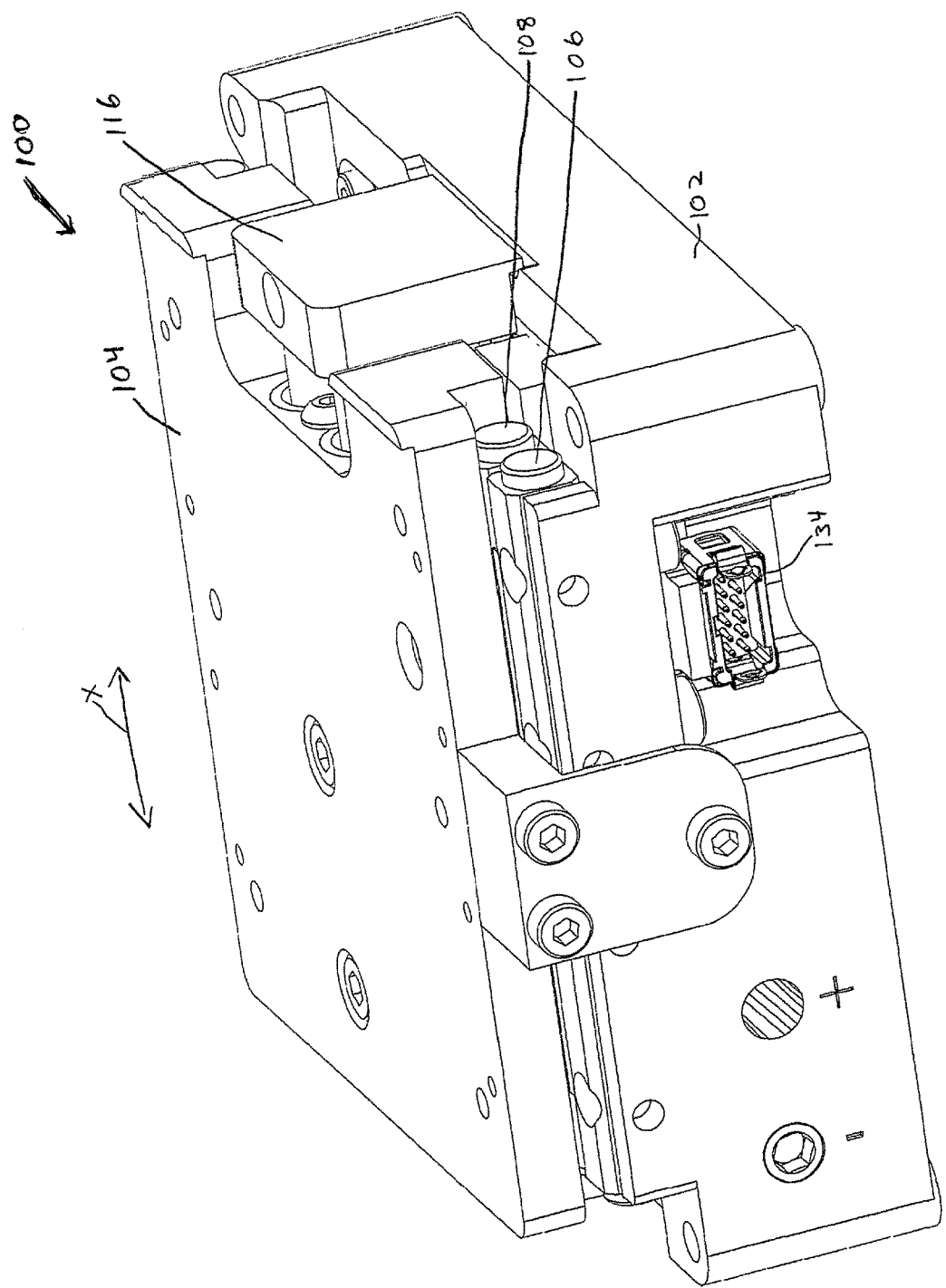
- FIG. 1 is a perspective view of a single axis linear motion system according to an embodiment having crossed roller bearings.
Figure 2:
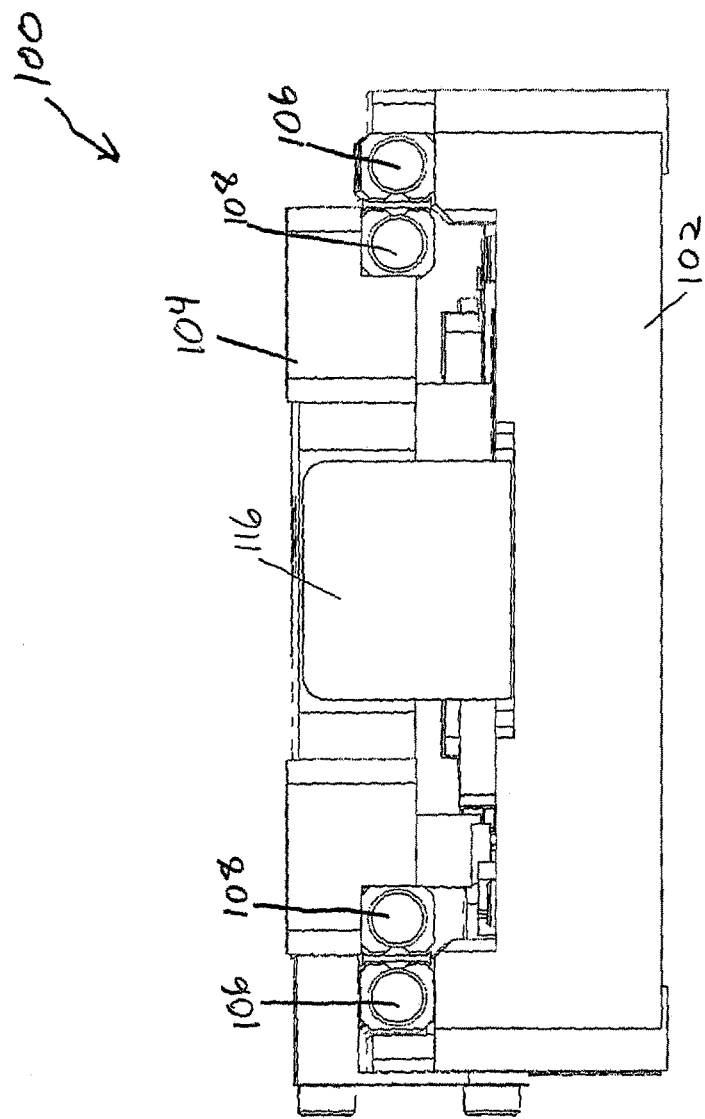
FIG. 2 is an end view of the single axis linear motion system of FIG. 1.

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

Certain terminology is used in the following description for convenience only and is not limiting. The words "bottom," "top," "left," "right," "lower" and "upper" designate directions in the drawings to which reference is made. Unless specifically set forth herein, the terms "a," "an" and "the" are not limited to one element but instead should be read as meaning "at least one." The terminology includes the words noted above, derivatives thereof and words of similar import.

The figures show embodiments of linear motion system 100 according to the presently disclosed technology are shown. Referring to FIGS. 1-4, a single axis linear motion system 100 is shown having a base 102, which is stationary, and a moving carriage 104, which moves relative to base 102. Moving carriage 104 is movable back and forth along a single direction. For example, the single direction of movement may be a vertical direction. In FIGS. 1 and 4, the direction of movement of moving carriage 104 is illustrated by arrow X, while in FIG. 2, the direction of movement of the moving carriage 104 is into and out of the page. A payload of interest may be mounted to moving carriage 104. For example, a microscope objective may be mounted to moving carriage 104.

The single axis linear motion system 100 of FIGS. 1-4 uses linear guideways to guide the moving carriage 104 relative to stationary base 102. In this embodiment, the linear guideways are crossed roller bearings having two stationary rails 106 which may be mounted to base 102 (one on each side of base 102). Two moving rails 108 may be mounted to a side of moving carriage 104 (one on each side of moving carriage 104) facing base 102. Moving rails 108 guide moving carriage 104 in a straight line relative to stationary rails 106.

Figure 3:
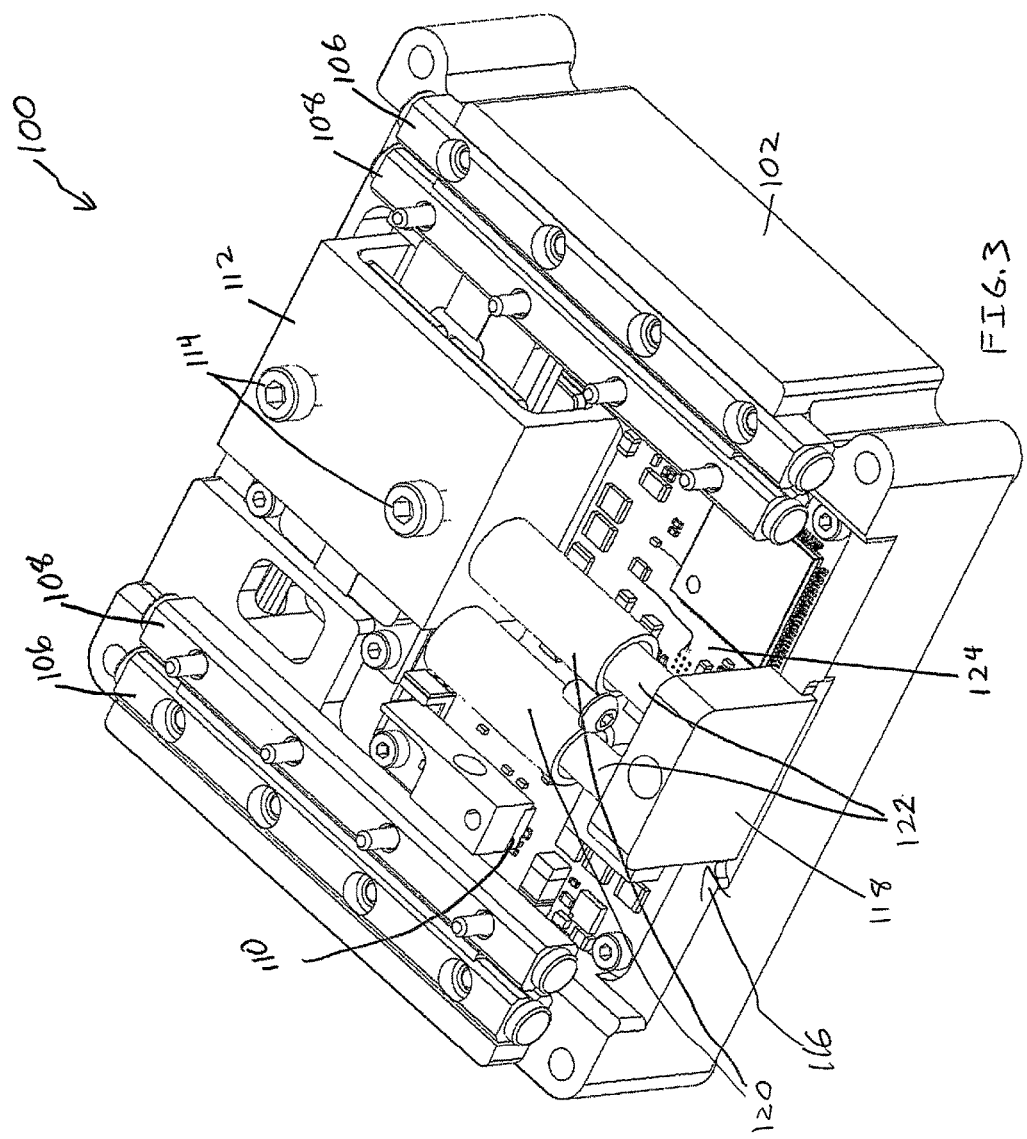
FIG. 3 is a top perspective of the single axis linear motion system of FIG. 1 with the moving carriage removed.
Figure 4:
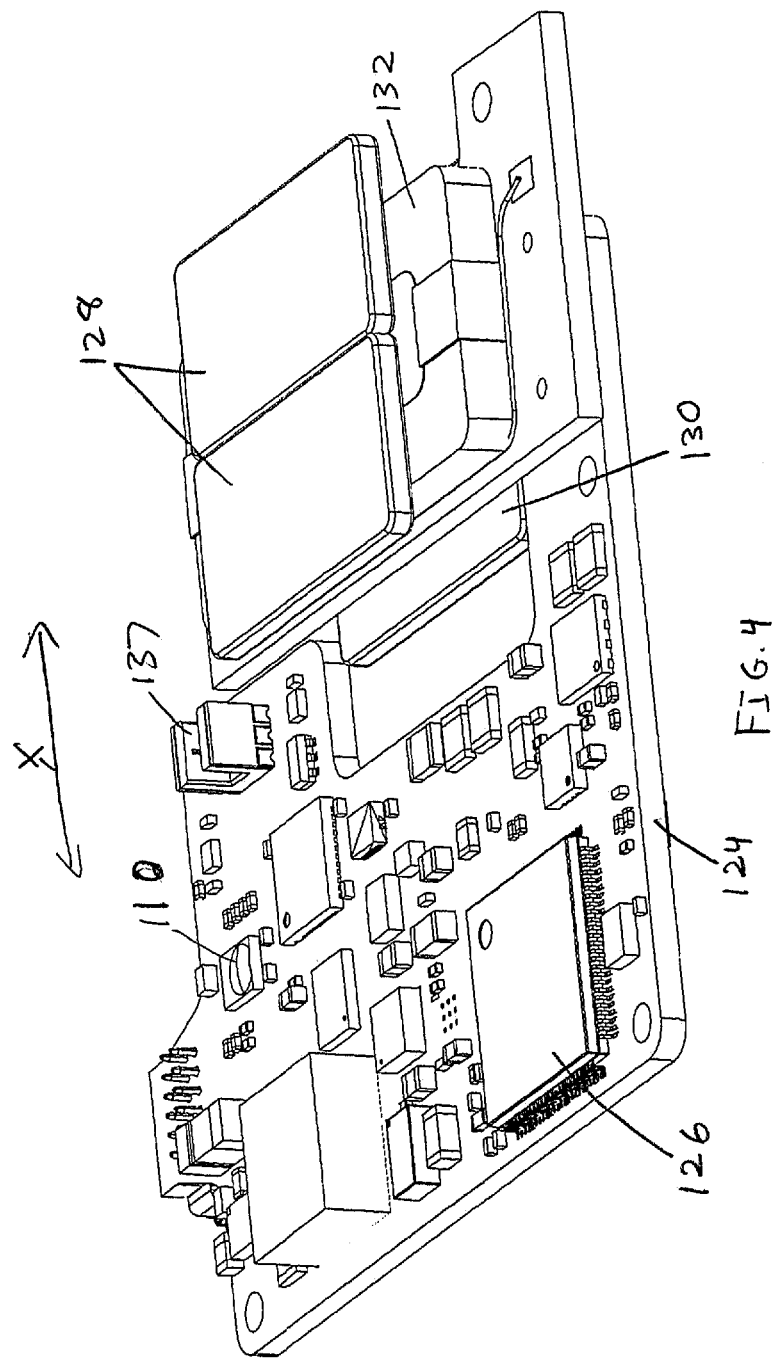
FIG. 4 is a top perspective of the single axis linear motion system of FIG. 1 with the moving carriage, base, stationary rails, moving rails, and magnet housing removed.

Referring to FIG. 3 which shows the single axis linear motion system 100 of FIG. 1 with moving carriage 104 removed, several components may be mounted to moving carriage 104. This view illustrates that the two moving rails 108 may be mounted to moving carriage 104. For example, screws that extend along the length of the moving rails 108 may be used to couple the moving carriage 104 to the moving rails 108. A linear encoder 110 may be included to determine the position of moving carriage 104 relative to stationary base 102. The encoder preferably is located internal to the stage. Encoder 110 may be electro-optical components mounted on a printed circuit board (PCB) 124. For example, encoder 110 (shown with component removed) in FIG. 4) may be an optical component which shines a light on an encoder scale provided on the underside of the moving carriage 104 such that the encoder may be able to track its motion relative to the encoder scale. In addition, this view illustrates that a magnet housing 112 may be mounted to moving carriage 104 using, for example, threaded fasteners 114. A home switch 137 may also be provided on PCB. Home switch 137 shines a light across its U-shape. The light becomes blocked or unblocked due to movement of moving carriage 104.

The single axis linear motion system 100 may optionally include a magnetic counterbalance 116 that can prevent moving carriage 104 from becoming overextended. For example, in applications in which moving carriage 104 is mounted for vertical movement with an attached microscope objective, a sudden power outage could cause the microscope objective to drop and become damaged. In such situations, the magnetic counterbalance 116 could provide a counterweight resistance that prevents such a drop from occurring. For example, magnetic counterbalance 116 could be tuned to the weight of moving carriage 104/objective payload. Also, another role of magnetic counterbalance 116 is to allow motor power to be fully available to accelerate moving carriage 104 and any payload rather than to create waste heat by opposing gravity. As shown in FIG. 3, magnetic counterbalance 116 can include a counterbalance mount 118, counterbalance tubes 120, and counterbalance magnets 122 disposed within counterbalance tubes 120. Unlike a spring, which provides a force that is proportional to stretching distance, magnetic counterbalance 116 can provide a constant force that is substantially constant regardless of distance of movement of moving carriage 104.

FIG. 4 illustrates the embodiment of FIG. 1 with base 102, moving carriage 104, stationary rails 106, moving rails 108 and magnet housing 112 removed. Accordingly, this view presents a clear perspective of the PCB 124, which is mounted on base 102. An integrated controller and drive 126 is mounted on the PCB 124. Magnet housing 112 (not illustrated in this view) can house a set of upper magnets 128 and lower magnets 130, with one or more stationary coils 132 sandwiched in between. Current can be supplied to the one or more coils 132 from the drive 126 via PCB 124. Current flowing through the one or more stationary coils 132 causes the upper magnets 126 and lower magnets 128 (and thus moving carriage 104, on which the upper magnets 126 and lower magnets 128 are mounted by way of magnet housing) to move relative to the one or more stationary coils 132.

PCB 124 may include one or more ports 134 (FIG. 1) for providing communications and power. For example, a user may control single axis linear motion system 100 using an external computer. A user may use the computer to send motion commands to the single axis linear motion system 100. No moving cables are required when the PCB is located in the non-moving part such as base 102.

Referring to FIGS. 5-8, an alternative embodiment of a single axis linear motion system 200 is shown also using crossed roller bearings. Hereinafter, the elements of alternative embodiments having similar characteristics as those previously described shall be indicated with the same reference numbers increased by 100 units. Single axis linear motion system 200 includes an integrated PCB 224 having a controller 226 mounted thereon. This embodiment features a different configuration of magnets, which may be housed within a moving carriage 204.

Figure 5:
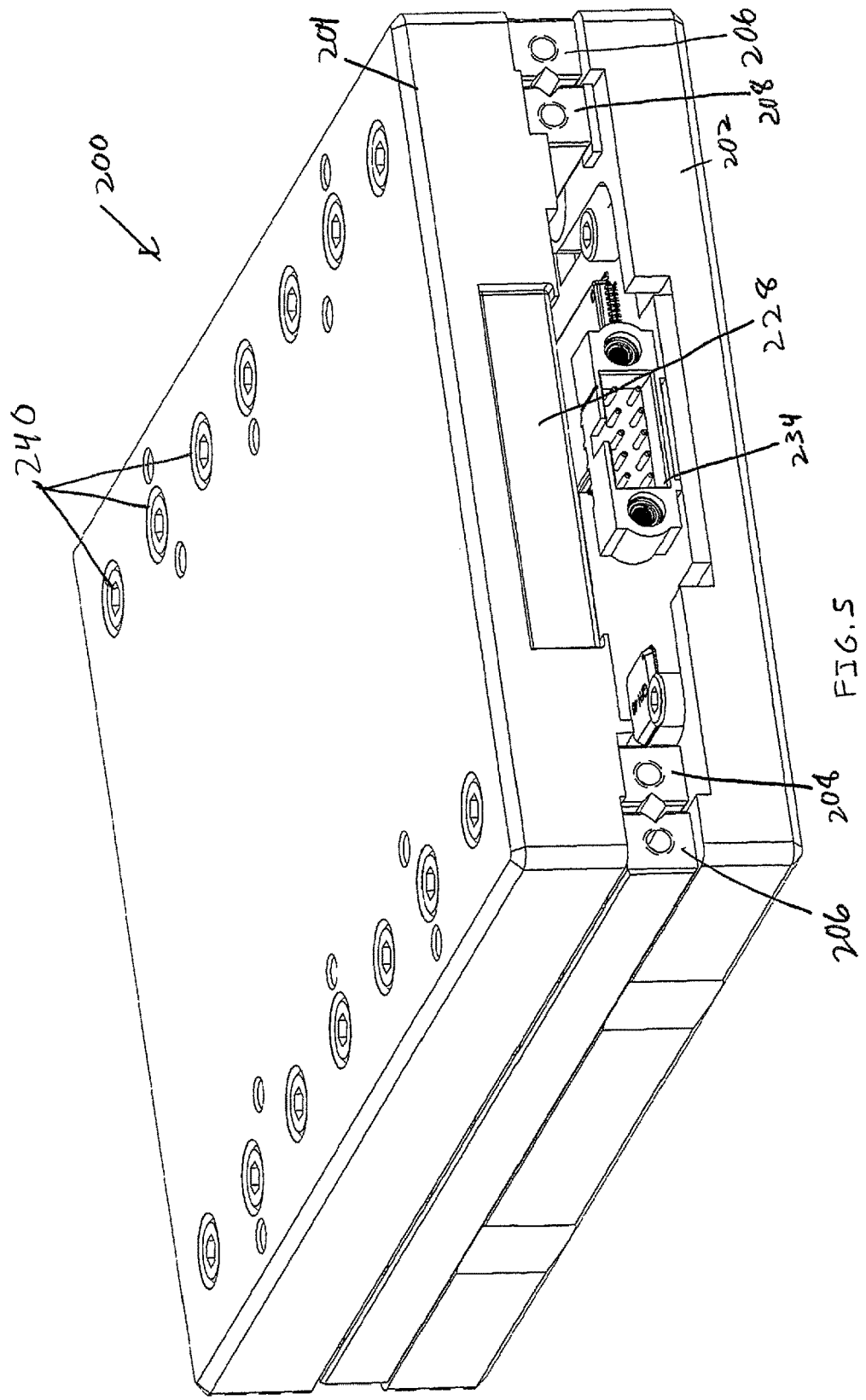
FIG. 5 is a perspective view of a single axis linear motion system according to another embodiment having crossed roller bearings.

The components illustrated in FIGS. 5-8 are substantially the same as in the embodiment of a single axis linear motion system 100 of FIGS. 1-4, except this embodiment of a single axis linear motion system 200 lacks the optional magnetic counterbalance 116. Also, in this embodiment of a single axis linear motion system 200, magnets 228 are mounted on moving carriage 204. For example, a first of several magnets 228 is visible on one end of moving carriage 204 (FIG. 5). Two stationary rails 206 which may be mounted to base 202. Two moving rails 208 may be mounted to a moving carriage 204 with, for example, threaded fasteners 240.

Figure 6:
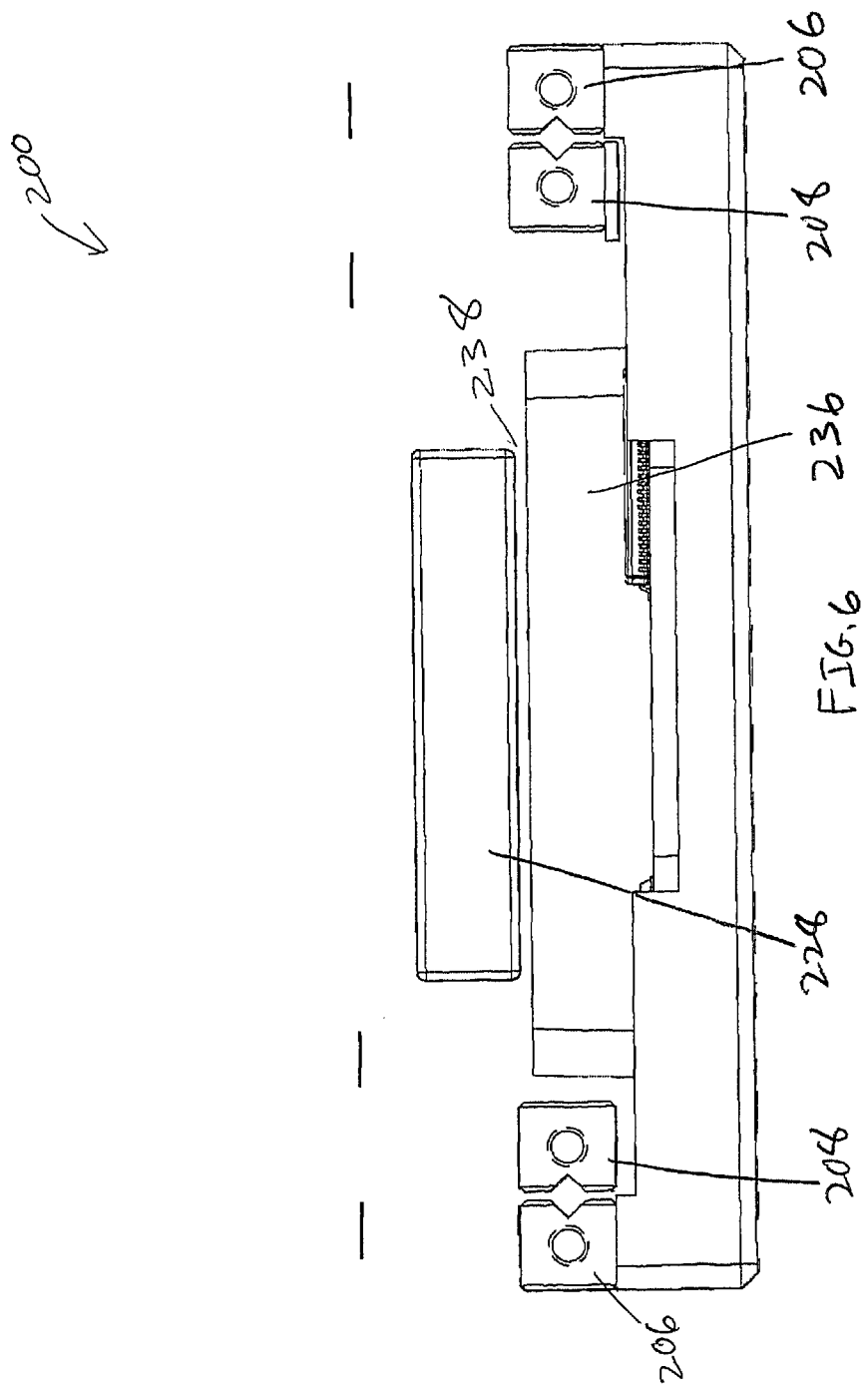
FIG. 6 is an end view of the single axis linear motion system of FIG. 5 with the moving carriage removed.

FIG. 6 illustrates single axis linear motion system 200 with the moving carriage 204 removed. Magnets 228 (which are housed within moving carriage 204) are shown.

Base 202 includes PCB 224 (FIGS. 7 and 8) mounted thereon. A coil housing 236, which houses the one or more coils 232, may be mounted on PCB 224 and/or base 202. An air gap 238 (FIG. 6) separates coil housing 236 and magnets 228.

Figure 7:
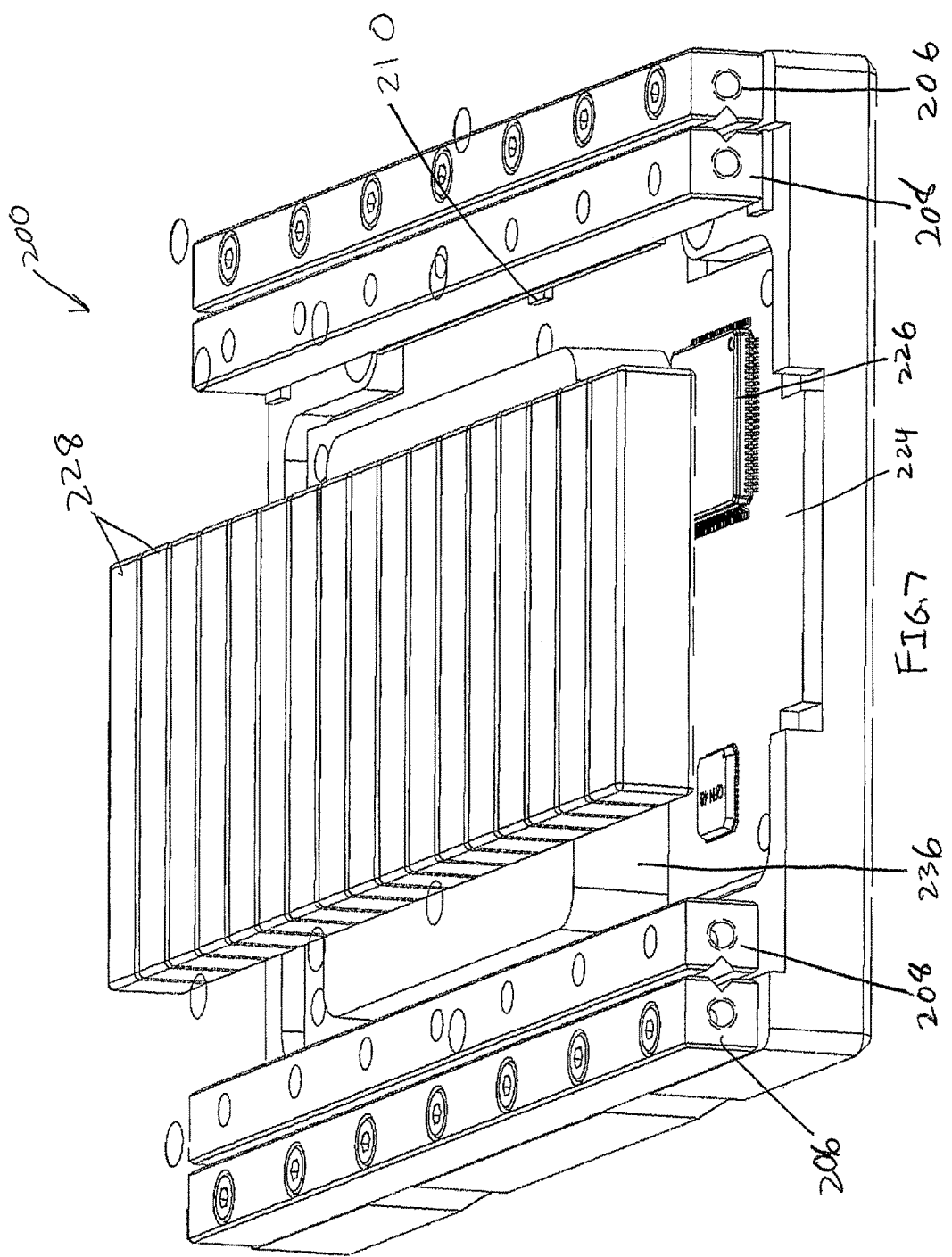
FIG. 7 is a top perspective of the single axis linear motion system of FIG. 5 with the moving carriage removed.

Referring to FIG. 7, which shows single axis linear motion system 200 with moving carriage 204 removed, several magnets 228, which are mounted within moving carriage 204, may be arranged in a row.

Figure 8:
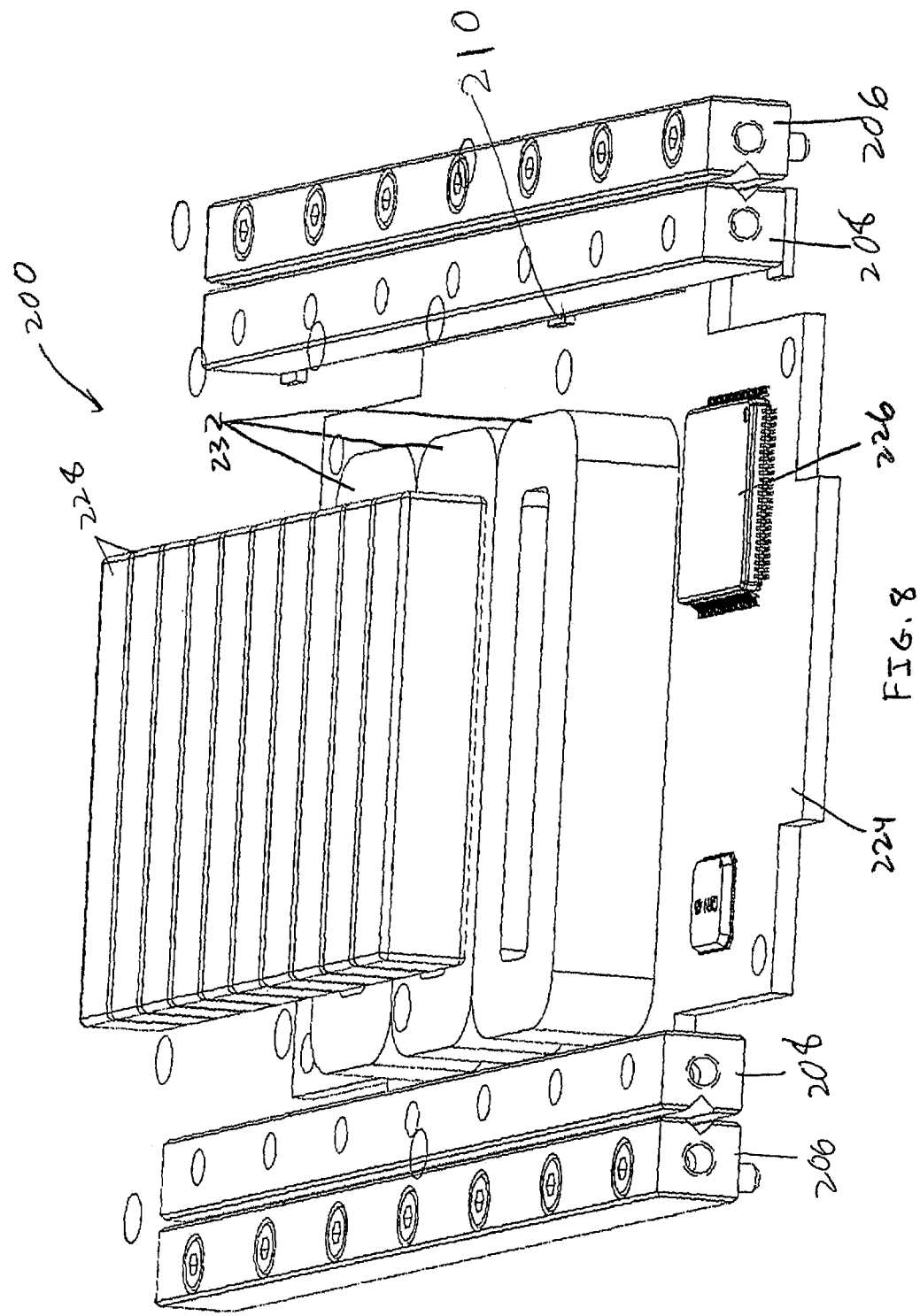
FIG. 8 is a top perspective of the single axis linear motion system of FIG. 1 with the moving carriage and base removed.

Referring to FIG. 8 which shows single axis linear motion system 200 with base 202 and moving carriage 204 removed, one or more coils 232 mounted on PCB 224 are shown. Current is supplied to the one or more coils 232 from the controller/drive 226 via PCB 224. At least one linear encoder 210 positioned beneath moving rails 208 may be included to determine the position of moving carriage 204 relative to stationary base 202.

Figure 9:
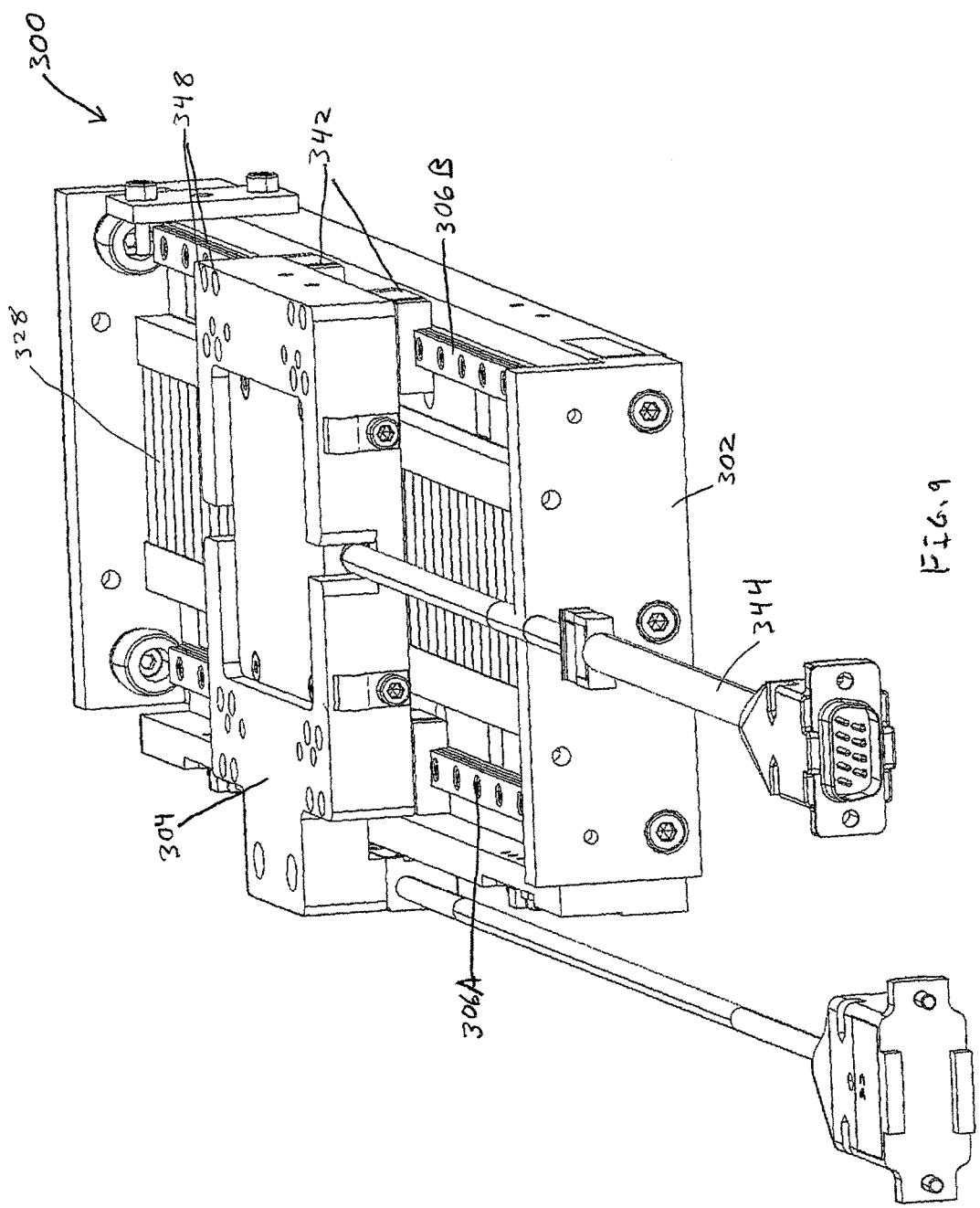
FIG. 9 is an end perspective view of a single axis linear motion system according to another embodiment having linear recirculating bearings.
Figure 10:
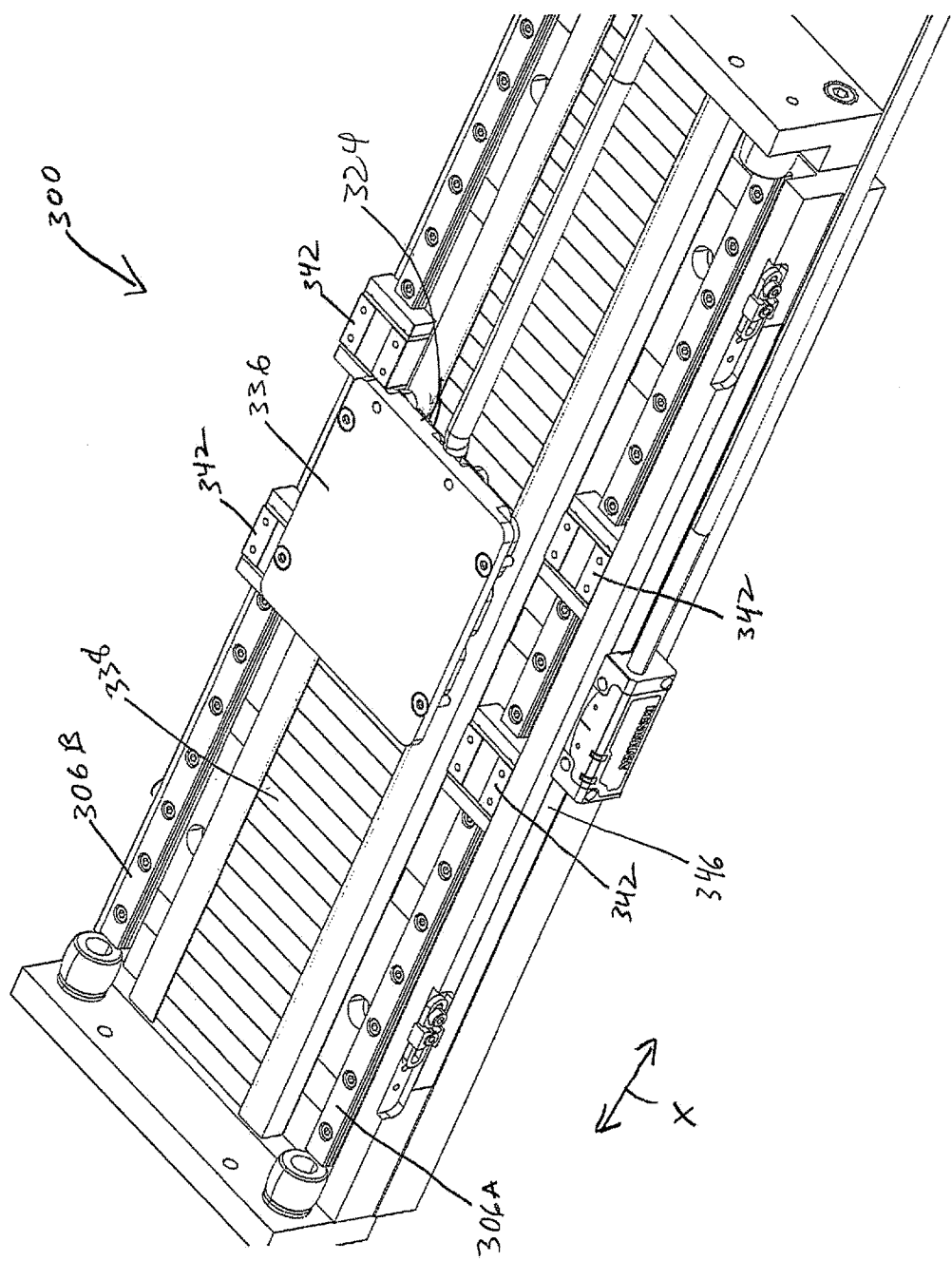
FIG. 10 is a top perspective view of the single axis linear motion system of FIG. 9 with the moving carriage removed.
Figure 11:
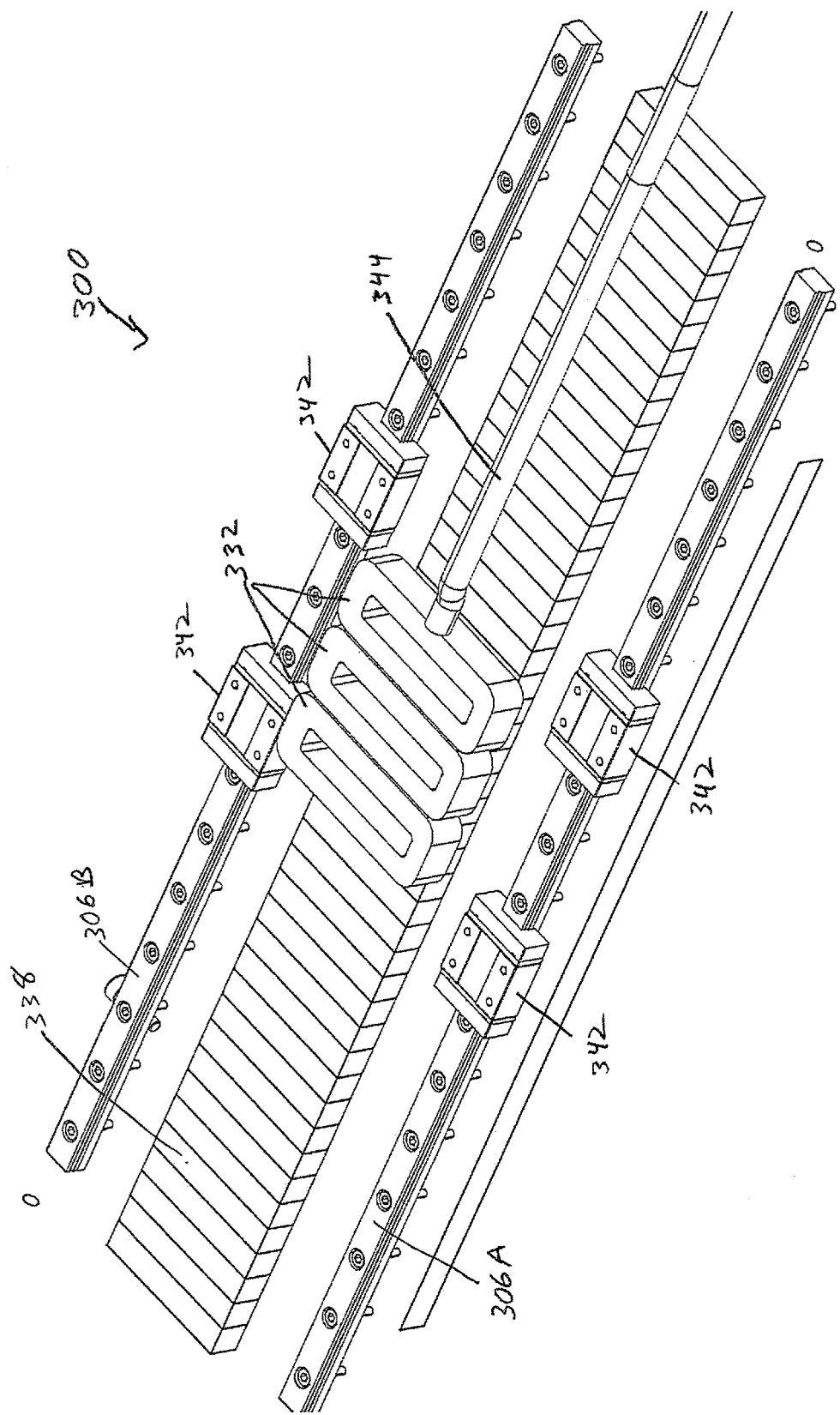
FIG. 11 is a top perspective of the single axis linear motion system of FIG. 9 with the moving carriage, coil housing, and base removed.

Referring to FIGS. 9-11, an alternative embodiment of a single axis linear motion system 300 is shown which uses linear recirculating bearings. Linear motion system 300 preferably has an integrated PCB having a controller mounted therein.

Referring to FIG. 9, this recirculating-bearing embodiment features a base 302 with a long row of stationary magnets 328. Each side of base includes a stationary rail 306A, 306B that extends along the length of base 302. A moving carriage 304 can be mounted on trucks 342 that move along rails 306. For example, moving carriage 304 may be coupled to the left rail 306A using a set of two trucks 342 (more clearly shown in FIG. 10) and may also be coupled to the right rail 306B using another set of two trucks 342. This view also illustrates the through holes 348 present in moving carriage 304 used to connect moving carriage 304 to each of the four trucks 342.

Coils 332 can be located within moving carriage 304. Communications and power may be supplied to moving carriage 304 using cable 344. Accordingly, cable 344 can be adapted to flexibly move such that it remains coupled to the moving carriage 304 as it moves. In some embodiments, a PCB 324 with integrated controller/drive, and coils 332 may be disposed within moving carriage 304. The PCB 324 with integrated controller/drive may receive communications and power from the cable 344 such that movement commands are converted into the appropriate current signals that are supplied to coils 332. The coil 332/PCB 324 assembly may be housed within a coil housing 336 (FIG. 10). In alternative embodiments, the PCB 324 with integrated controller/drive 334 may be mounted on the base 302, and a cable may be provided to couple the current output from the drive to the coils 332. An encoder as well as other components such as those discussed above may also be mounted on PCB 324.

Referring to FIG. 10, this view illustrates single axis linear motion system 300 with moving carriage 304 removed.

Referring to FIG. 11, this view provides a view of single axis linear motion system 300 without the moving carriage 304, coil housing 336, and base 302. This view illustrates a cable 350 attached to moving carriage 304 may supply power that is used to provide current to the one or more coils 332.

Alternative to PCB 324 assembly being mounted with moving carriage 304, the PCB, controller, and drive may be located elsewhere within the base/stage and provide current to the coils in the moving carriage via a cable.

Figure 12:
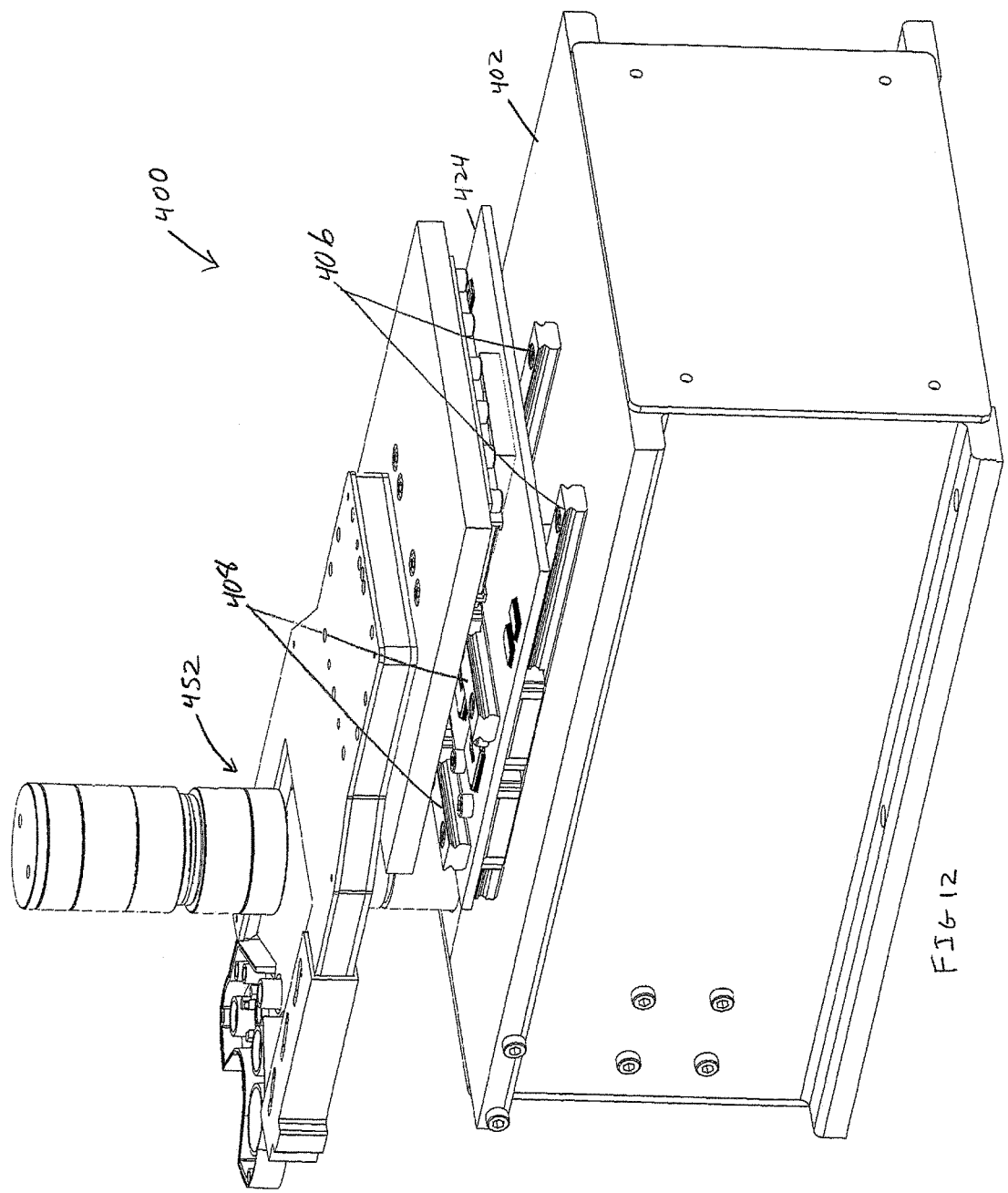
FIG. 12 is a perspective view of a dual axis linear motion system according to another embodiment having linear recirculating bearings.
Figure 13:
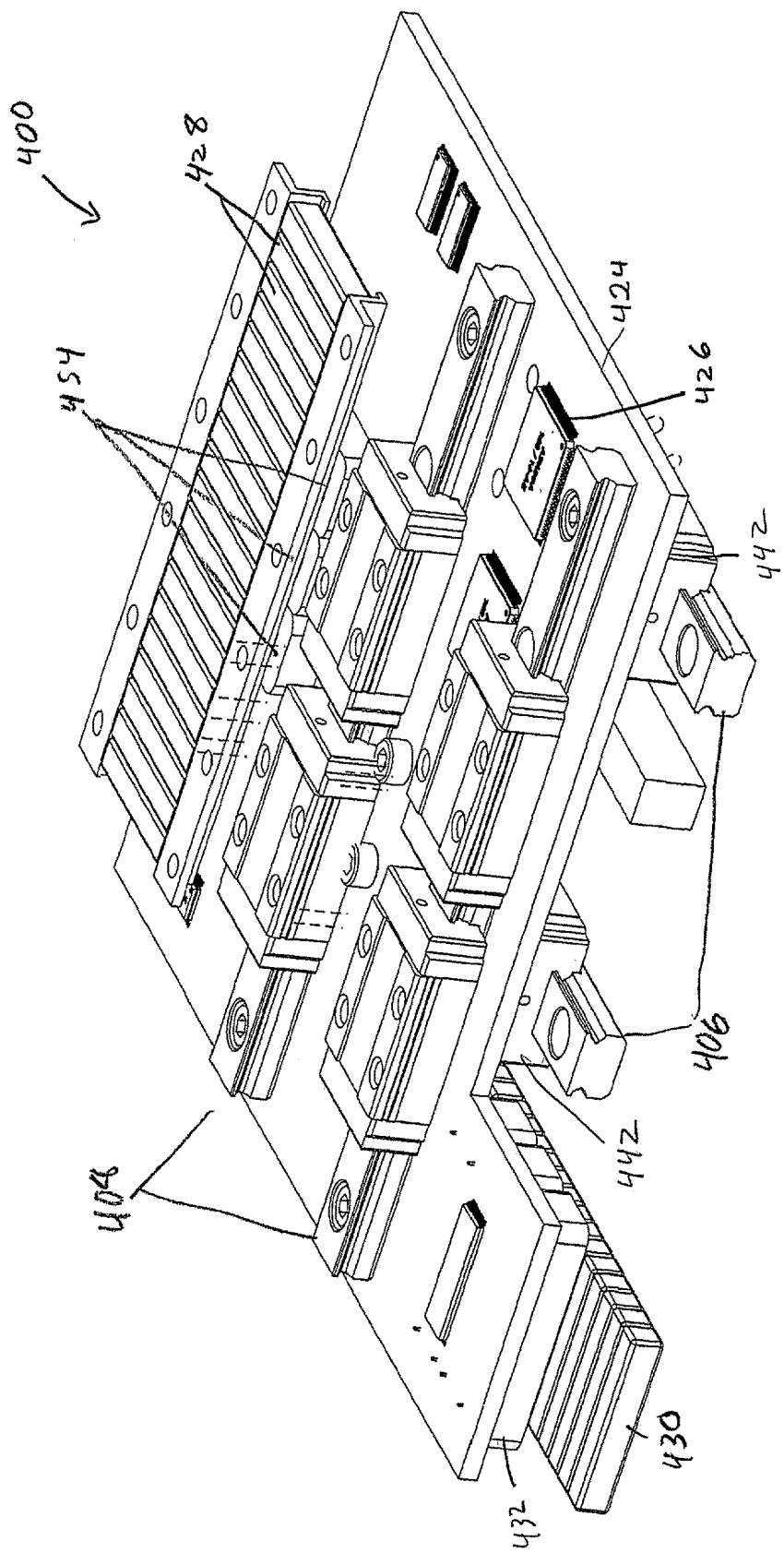
FIG. 13 is a top perspective view of the dual axis linear motion system of FIG. 12 with the base and moving carriage removed.

Referring to FIGS. 12-13, an alternative embodiment of a dual axis linear motion system 400 is shown which uses linear recirculating bearings. This embodiment features two linear motion stages providing two axes of motion and includes a third center plate which is a PCB 424, which incorporates a controller/drive 426, motor coils and encoder for each axis of movement.

Referring to FIG. 12, dual axis linear motion system 400 is shown that is used position, for example, a lens tube/objective payload 452 relative to a base 402.

In the illustrated embodiment, two x-axis stationary rails 406 may be mounted to base 402. PCB 424 has trucks 442 mounted to its underside that move along x-axis rails 406 in the x-direction. Two y-axis rails 408 are mounted to the topside of PCB 424.

A moving carriage 404 has trucks 454 mounted to its underside for movement along y-axis rails 408. Accordingly, by varying the x-axis movement and y-axis movement, the moving carriage 404, having lens tube/objective payload 452 attached thereto, may be controlled to move in x and y directions.

Referring to FIG. 13, a first bottom set of magnets 430 that are used to provide movement in an x-direction may be mounted on base 402. Just above the bottom set of magnets 430, and mounted to the underside of PCB 424, are a set of lower coils 432.

As shown, a controller and drive 426 may be mounted on PCB 424. Two rails 408 for travel in a y-direction may be mounted to the top of PCB 424. An upper set of coils 452 may be mounted to the upper side of PCB 424. Above these coils 452, a top set of magnets 428 are mounted to the underside of moving carriage 404.

Referring to FIGS. 14-15, an alternative embodiment of a dual axis linear motion system 500 is shown which uses linear recirculating bearings. In previous embodiments that used recirculating bearings, two rails are used to provide motion in a particular direction. However, in other embodiments, any number of parallel rails may be used to provide motion in a certain direction. In this embodiment, three x-axis rails 506 mounted to a base 502 are used to provide motion along an x direction, and three additional y-axis rails 508 are used to provide motion along a y direction.

In particular, each x-axis rail 506 is coupled to a truck 542, each of which features a small platform on which each y-axis rail 508 may be mounted. Another set of trucks 554 may be coupled to each y-axis rail 508 and mount to the underside of a moving carriage 504.

A PCB 524 may be provided on base 502. PCB 524 may include a controller/drive, motor coils and a two-dimensional encoder 510 thereon on each side of PCB 524. The motors coils interact with motor magnets 526. Cables may be provided to couple the drive to each set of coils (not shown in this embodiment). Two-dimensional encoder 510 includes an encoder scale 510A (FIG. 16) having two sets of parallel lines at right angles to each other in order to measure movement in both the x-direction and the y-direction, An alternative embodiment (not shown) of a dual axis linear motion system uses crossed roller bearings. Instead of the linear recirculating bearings of the embodiment of FIGS. 12 and 13, crossed roller bearings such as those shown in FIGS. 5-8 may be used instead for each stage.

A further alternative embodiment (not shown) of a dual axis linear motion system uses a hybrid configuration of crossed roller bearings (as shown in FIGS. 5-8) in one direction and linear recirculating bearings (as shown in FIGS. 12-13) in the second direction. For example, the stage that provides motion in an x axis direction may use recirculating bearings, as described above, and the stage that provides motion in a y direction may use crossed roller bearings.

Changes could be made to the embodiments described above without departing from the broad inventive concept thereof. It is understood, therefore, that the presently disclosed technology is not limited to the particular embodiments disclosed, but it is intended to cover modifications within the spirit and scope of the present invention as defined by the appended claims. If not otherwise stated herein, it may be assumed that all components described heretofore may, if appropriate, be considered to be interchangeable with similar components disclosed elsewhere in the specification or may be incorporated into other disclosed embodiments, unless an express indication is made to the contrary. Although the invention has been described in terms of particular embodiments in this application, one of ordinary skill in the art, in light of the teachings herein, can generate additional embodiments and modifications without departing from the spirit of, or exceeding the scope of, the described invention. Accordingly, it is understood that the drawings and the descriptions herein are proffered only to facilitate comprehension of the invention and should not be construed to limit the scope thereof.

We claim:

1. A linear motion system comprising:
   a base;
   a moving carriage configured to move back and forth along a single linear direction relative to the base;
   at least one motor coil;
   at least one motor magnet;
   at least one printed circuit board mounted on the base;
   an electronic motion controller configured to provide motion commands to an electronic drive; and
   the electronic drive configured to translate commands from the electronic motion controller into currents supplied to the at least one motor coil;
   wherein the electronic motion controller and electronic drive are mounted on the at least one printed circuit board.

2. The linear motion system of claim 1, wherein the at least one printed circuit board is disposed between an upper surface of the base and a lower surface of the moving carriage.

3. The linear motion system of claim 1, wherein the at least one motor magnet is mounted on the moving carriage, and wherein the at least one motor coil is mounted on the at least one printed circuit board mounted on the base.

4. The linear motion system of claim 1, wherein the at least one motor magnet is mounted on the base, and wherein the at least one motor coil is mounted on the moving carriage.

5. The linear motion system of claim 1, wherein the at least one motor magnet is mounted on the moving carriage, and wherein the at least one motor coil is mounted on the base.

6. The linear motion system of claim 1, further comprising at least two linear guideways configured to guide the moving carriage relative to the base.

7. The linear motion system of claim 6, wherein the at least two linear guideways comprise at least two spaced apart stationary rails; and wherein the electronic motion controller and electronic drive are disposed between the at least two spaced apart stationary rails.

8. The linear motion system of claim 6, wherein the at least two linear guideways comprise crossed roller bearings.

9. The linear motion system of claim 8, wherein the crossed roller bearings include at least two stationary rails mounted on the base and at least two moving rails mounted on the moving carriage.

10. The linear motion system of claim 6, wherein the at least two linear guideways comprise linear recirculating bearings.

11. The linear motion system of claim 1, further comprising a linear encoder configured to determine the position of the moving carriage relative to the base.

12. The linear motion system of claim 11, wherein the linear encoder comprises an encoder read head and an encoder scale.

13. The linear motion system of claim 12, wherein the encoder read head is mounted on the at least one printed circuit board.

14. A linear motion system comprising:
   base;

a moving carriage configured to move back and forth along a single linear direction relative to the base;

at least one motor coil;

at least one motor magnet;

at least one printed circuit board mounted on one of the base and the moving carriage;

an electronic motion controller configured to provide motion commands to an electronic drive; and the electronic drive configured to translate commands from the electronic motion controller into currents supplied to the at least one motor coil;

wherein the electronic motion controller and electronic drive are mounted on the at least one printed circuit board:

further comprising at least two linear guideways configured to guide the moving carriage relative to the base;

wherein the at least two linear guideways comprise linear recirculating bearings; and wherein the linear recirculating bearings include at least two stationary rails mounted on the base and at least four trucks mounted to the moving carriage and configured to roll along grooves in the at least two stationary rails.

15. The linear motion system of claim 14, further comprising a magnetic counterbalance configured to prevent the moving carriage from becoming overextended as moves relative to the base.

16. The linear motion system of claim 15, wherein the magnetic counterbalance comprises a counterbalance mount attached to at least one counterbalance magnet, wherein each of the at least one counterbalance magnet is disposed within a counterbalance tube.

* * * * *